United States Patent [19]
Lyke

[11] Patent Number: 6,148,399
[45] Date of Patent: Nov. 14, 2000

[54] ADVANCED INSTRUMENT CONTROLLER STATEMENT OF GOVERNMENT INTEREST

[75] Inventor: James C. Lyke, Albuquerque, N. Mex.

[73] Assignee: The United States of America as represented by the Secretary of the Air Force, Washington, D.C.

[21] Appl. No.: 09/178,876

[22] Filed: Oct. 26, 1998

[51] Int. Cl.[7] .................................................. G06F 9/24
[52] U.S. Cl. ................................. 713/32; 713/10; 713/11
[58] Field of Search ..................... 710/48, 260; 709/100, 709/105; 712/1, 2, 10, 32; 363/141; 701/49

[56] References Cited

U.S. PATENT DOCUMENTS

| | | | |
|---|---|---|---|
| 5,563,928 | 10/1996 | Rostoker et al. | 377/20 |
| 5,678,057 | 10/1997 | Rostoket et al. | 395/800 |
| 5,761,516 | 6/1998 | Rostoker et al. | 395/733 |
| 5,973,376 | 10/1999 | Rostoker et al. | 257/401 |
| 6,049,748 | 4/2000 | Newman et al. | 701/49 |
| 6,061,260 | 5/2000 | Chen et al. | 363/141 |

*Primary Examiner*—Thomas C. Lee
*Assistant Examiner*—Harold Kim
*Attorney, Agent, or Firm*—Kenneth E. Callahan

[57] ABSTRACT

The Advanced Instrument Controller (AIC) is a stand-alone low-to-medium performance microcontroller with versatile interface and operating options. A tightly coupled MCM design incorporates a CPU, volatile and non-volatile memories, an analog ASIC, a resistor ASIC, internal oscillator, an agile analog capability to implement a gain, offset, impedance, and filter control on all input channels, and an embedded smart power convertor. The AIC uses switch matrices built from micro-mechanical systems technology to reconfigure the signal lines. It also has in-situ reprogrammability and state preservation capability for discontinuous operations. It is designed to operate under extreme conditions of temperature, shock, and radiation and is characterized by ultra-low power requirements, size, and weight.

1 Claim, 13 Drawing Sheets

ADVANCED INSTRUMENT CONTROLLER STATEMENT OF GOVERNMENT INTEREST

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

The present invention generally relates to multi-chip module (MCM) microcircuits, and more specifically to a compact (few-chip) MCM electronics control system that exploits the tight coupling of components from non-similar processes and non-volatile storage for numerous monitoring/controlling applications under harsh conditions.

2. Description of the Prior Art

Space-based experiments heretofore have typically used separate board-mounted payload, control, and data acquisition circuit boards that are generally bulky, power hungry, and expensive. The present invention combines the controller and data acquisition functions into a single, tightly coupled MCM design. Many MCM implementations of designs have been previously undertaken, but designs approaching the capability of the present invention would be large and unwieldy. Tightly coupled MCMs refer to MCMs whose components possess one or more of the following features: (1) more input/output (I/O) terminal contacts than is normally consistent with a discrete implementation, (2) lower capacitive drive in output circuits than is normally consistent with a discrete implementation, (3) I/O terminals in locations inconsistent with standard integrated circuits (ICs), (4) I/O circuitry with reduced or eliminated electrostatic discharge protection structures. By tightly coupling the MCM, more complex interactions between the components within are possible, introducing a design with similar physical appearance and size of a packaged integrated circuit, but with greater functional capability than possible with a single integrated circuit. In other words, a tightly coupled MCM is built like a hybrid microcircuit but possesses a highly integrated behavior more consistent with "system-on-a-chip" or monolithic IC designs. The result is greatly reduced size, weight, and power consumption over discrete implementations ("discrete" referring to an arrangement of several individually packaged ICs built onto a circuit board or other presumably multi-layer wiring medium). The present invention combines in a small MCM a number of functions not presently possible in a single integrated circuit. "Small" is a relative term, and in this case refers to an MCM that is in size comparable to an integrated circuit in a quadruple flat package.

SUMMARY OF THE INVENTION

The Advanced Instrument Controller (AIC) is a stand-alone, compact, low-power electronics control system applicable to a wide variety of applications, particularly those requiring flexibility, remote access, or discontinuous operation. The AIC is a tightly coupled multi-chip module (MCM) that uniquely combines plastic high-density interconnects (HDI) patterned overlay MCM substrates, surface-mounted components for trimming end performance, and in-situ reprogrammability of memory. The AIC uniquely combines inherent core and I/O features, design methodology, and operating principles to create an electronics building block with numerous monitoring/controlling applications. The AIC's primary characteristics are small size, weight and power, versatile functionality, and compatibility with robust application regimes, e.g., extreme cold, shock, or radiation.

The functional innovations within the Advanced Instrument Controller (AIC), being a tightly coupled MCM, are based on the ensemble of core and I/O functions and the way they are used. Here, core functions include a central processing unit (CPU), static random access memory (single- or multi-ported), non-volatile memory (e.g., flash or EEPROM), reconfigurable gate array, reconfigurable interconnect devices, analog function blocks, embedded power conversion, and a passive component network. I/O functions include analog inputs (to a digitizer), analog outputs (from a digital representation), adjustable analog signal paths (variable gain, offset, impedance, signal filtration properties), serial communications ports, interrupts, and digital discrete I/O. The AIC includes a larger number and variety of core function and a more integrated interaction between them. The types of interactions uniquely permitted include: (1) in-situ reprogrammation of the controller's operational software (program code); (2) individualization of the AIC (serial codes, embedded descriptions of design specification, past history, maintenance); (3) storage of configuration information for setting properties of functional units; and (4) creative power management options for discontinuous (going from powered to non-powered operation) operation effected through state preservation and recovery. Some of these features have been previously realized in designs, but never to the degree and in the combination possible by the AIC.

DESCRIPTION OF THE PREFERRED EMBODIMENT

The Advanced Instrument Controller (AIC) provides an extremely compact, low-power alternative to simple system control applications where a highly functional solution with low external component count is required. The AIC embodies many features that make it possible in some cases to use no additional pre-scaling, timing, and other supplemental electronics. As such, the AIC is similar to a "system-on-a- chip" and appears similar to a chip in size, weight, and physical configuration, but through a tightly coupled MCM implementation, transcends the functional capability of a single integrated circuit. The AIC combines a central processing unit, an analog application-specific integrated circuit (ASIC), a resistor ASIC, and volatile and non-volatile memory storage systems on a single tightly coupled MCM to achieve its stand-alone capabilities. These capabilities include ultra-low power requirements, extremely small size and weight, versatile functionality, and the ability to operate in extreme environments.

Figure 1:
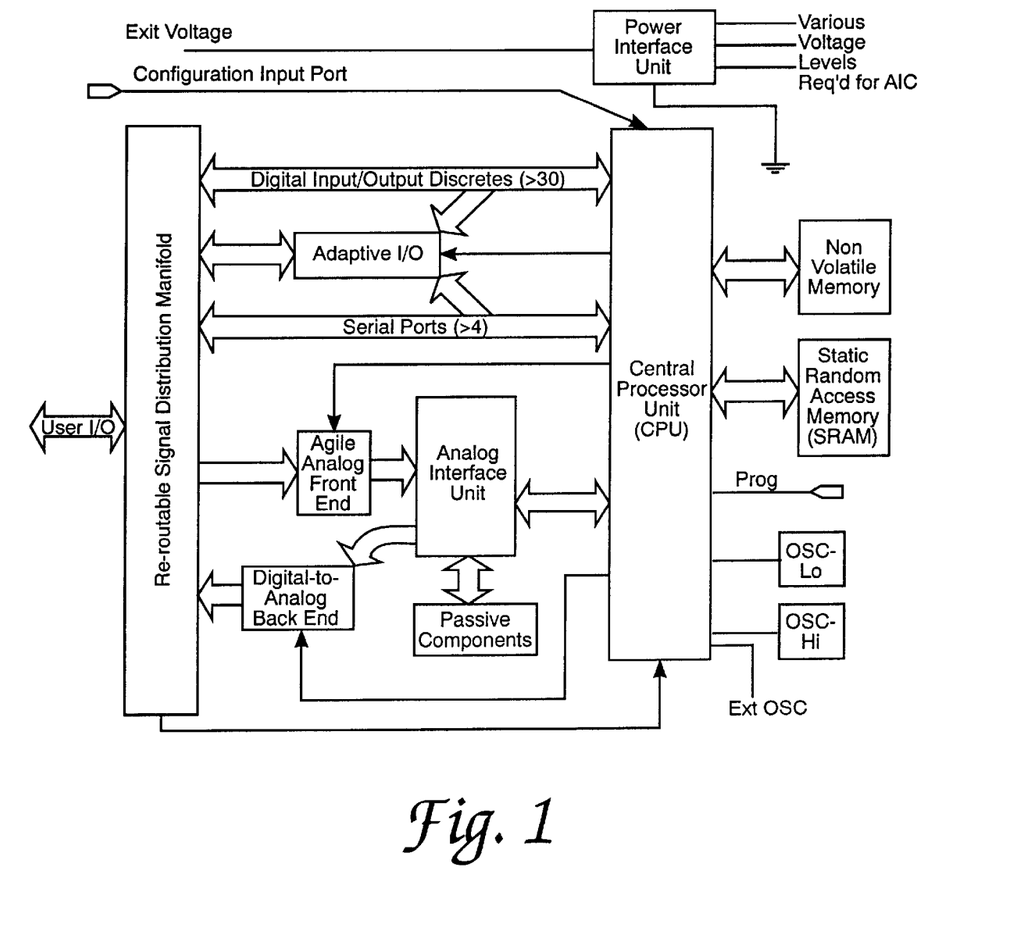
FIG. 1 is a block diagram schematic of the AIC.

FIG. 1 depicts the AIC block diagram schematic, illustrating the novel features. These features include a large number of analog inputs 1 and outputs 4, serial port interfaces 2, and digital discrete interface signals 3. There is a large non-volatile program and data storage component 5 and a large volatile data storage space 6, either comparable to or greater than the address space of the central processor unit (CPU) 7 within the AIC. There are built-in bypassable oscillators 8 for high and low speed operation, agile analog capability 9 to extend the range of analog inputs without added components, and a robust power convertor 10. AICs have the ability to re-route almost all external conductors and selected internal conductors, whether power or signal bearing. They also have in-situ reprogrammability and state preservation capabilities, and smart-signal adaptation capability on selected digital discrete interface signals.

The AIC provides a large number of analog inputs at high resolution (equal to or greater than 10 bits). A typical AIC configuration would contain 32 or more analog inputs that are externally accessible, and 16 more that are internal to the AIC, for the purposes of monitoring internal analog channel performance, internal thermometers, voltage references, etc.

In cases where AICs are used in networks, it is important to have a large number of serial interfaces. In current designs, it is necessary to add additional hardware to address more interfaces, whereas in the AIC a larger number are readily accommodated. These interfaces need to be flexible as well. AIC contains a number of both asynchronous serial ports (e.g., RS-232/RS-422) as well as synchronous (e.g., clocked) serial ports. The voltage levels of the serial ports default to CMOS-compatible levels by default. Using the adaptive I/O 12, those voltage levels can be adjusted. For example, the RS-232 ports could be adjusted to +/−4V instead of (0,3.3V) levels.

Figure 2:
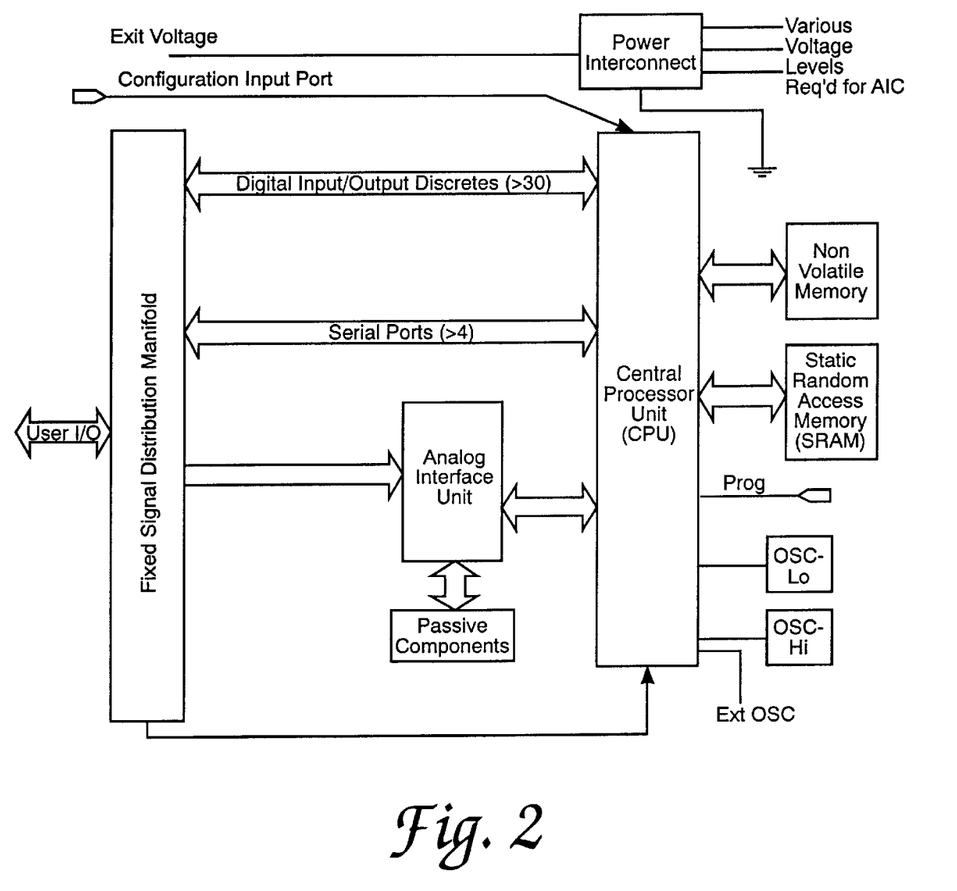
FIG. 2 is a block diagram of a low-cost, reduced capability AIC.

A reduced capability, low-cost AIC is shown in FIG. 2. This version is similar to the previously described AIC less the agile analog front end 9, the digital to analog back end 4, and the adaptive I/O 12. This version implements a reduced set of AIC core and I/O features, but retains the characteristic of a tightly coupled MCM with greater functional capability than a single monolithic IC contains at the time of implementation.

The full-up version of the AIC typically has more than 30 externally available discrete signal channels 2. These are bi-directional lines with pull-up or pull-down characteristics that can be externally set. When used as outputs, the I/O are CMOS level, but a subset of the lines can be passed through the adaptive I/O function to adjust the levels to two other voltage levels.

The AIC has analog voltage signals that can be individually set; an independent digital-to-analog convertor 4 controls each. A typical AIC has eight D/A convertors at a 10-bit resolution.

A large non-volatile memory storage system 5 is a cornerstone of AIC operation. This memory store is typically based on commodity memory components, unlike most other AIC internal components that are customized and tightly coupled within the MCM for maximum performance. The accommodation of commodity memory components is not considered a compromise since the AIC can benefit from the substantial industrial investment in such components that are as dense as the state-of-the-art in silicon processing permits. Furthermore, the AIC typically physically powers down the non-volatile device when power consumption needs to be minimized, so that the effects of non-optimized drivers (those not designed with tightly coupled methodologies) that are "power hungry" can be negated. A typical AIC contains a minimum of 128K bytes of non-volatile memory, usually EEPROM based. The non-volatile memory is used for both program storage and data storage, which can be changed repetitively, limited only by the fatigue mechanism associated with the non-volatile device.

The AIC can be operated discontinuously using the non-volatile memory for program and data storage. The ability to exploit non-volatile data storage allows the AIC to preserve the context of key operations by periodically storing state information. The existence of this state information is tested upon reset, especially after power is interrupted, to determine where the AIC last left operation (a simple form of rollback). The non-volatile data storage allows for AIC serialization, for AIC-specific calibration parameter storage (e.g., monitor the non-linearity of its own analog inputs and store the necessary corrective coefficients in memory), and for history-depending operations such as data logging. It is possible to also store AIC specifications, usage/maintenance history for recall during diagnosis, maintenance, and repair. The non-volatile memory of the AIC would also be used to program reconfigurable logic and interconnect devices within the AIC.

The AIC contains a volatile static random access memory (SRAM) 6 with storage contents comparable to or larger than the address space that the CPU operates upon. As in the case of non-volatile memories, the AIC employs typically a commodity SRAM component for the same reasons. The SRAM is always powered and contains a shadow copy of AIC program memory.

The AIC contains internal oscillators 8, at least two, one for high-frequency operation and one for low-frequency operation. The distinction of "two" oscillators is important, as it is necessary for power preservation to maintain an independent oscillator that operates at a lower frequency. In high-G applications or applications where both extreme cold and discontinuous operation are present, the AIC requires non-crystal based oscillators for effective operation. Otherwise, crystal oscillators may be used. The AIC also permits external oscillators for cases where synchronization or more precise timing is important. In all cases, the low frequency oscillator is independently generated to minimize power consumption in divider networks and fast-switching drivers. A typical AIC has an 11 MHz oscillator and 200 Hz oscillator for the high and low frequency internal reference, respectively.

An analog application-specific integrated circuit (ASIC) is used to implement many of the key instrumentation functions, including, for example: thirty-two external analog inputs with 12-bit resolution; eight independently programmable digital-to-analog convertor (DAC) channels with 10-bit resolution (fed back to some of the internal A/D channels); sixteen additional internal A/D channels with 12-bit resolution to monitor ASIC health and status; a band-gap reference; and a proportional to absolute temperature thermal sensor. The use of a separate integrated circuit for analog functions is important as it permits better electrical isolation from ICs within the IC containing digital switching circuitry (e.g., the processor and memory components). Such an approach permits better control of the analog system electrical environment.

The analog ASIC can be reprogrammed through one of the AIC's six serial ports. For example, each AIC can be personalized with a variety of unique data, such as serial codes, calibration coefficients, or a reduced "traveler" containing process history. The AIC designed for the Deep Space II mission is for example designed to function with discontinuous applied power due to the high probability that the extreme cold will temporarily render the battery nonfunctional periodically. This AIC will be able to display history-dependent behavior and be put to sleep for extended periods of time.

Typical analog-to-digital and digital-to-analog convertors (ADCs and DACs) have a fixed window for operation corresponding to zero and full scale digital readings (ADCs) or settings for voltage control (DACs). A typical AIC possesses a default window of 0–4.096V for input range and 0–4.096V for output range. With a fixed window for this example, a –2V signal would be represent as 0V, and a 10V signal would be represented as 4.096V.

Impedance, bandwidth, and load drive capability are typically fixed in I/O systems. As such, overcoming these limitations require a number of external components, which add bulk, cost, power consumption, and complexity to a system design. The AIC extends the useable range of ADCs and DACs by providing an agile analog capability 9. Agile analog implements a global gain and offset on all input channels, as well as channel specific values for gain and offset. The AIC also can invert the gain of any channel. Additionally, the AIC can implement gross impedance control on inputs and outputs by offering several switch-activated settings. Finally, the bandwidth characteristics of the ADCs and DACs can be affected with a second-order programmable filter. All of these features are selectable for each channel. The feature of analog agility is implemented through a combination of DACs and switches. For greater precision and lower noise, micro-electromechanical switches can be used. The ability to recall a particular configuration upon power-up is critical in certain applications when such reconfigurable elements are present. Since the AIC employs non-volatile storage, it can initialize these elements quickly into user-specified default conditions, preventing short circuit or other load fault conditions.

A resistor ASIC is used in the AIC design to eliminate over 50 individual resistors. Its primary function is to provide support for the analog ASIC. Embedded passive elements within the interconnection system can also be used to further reduce floor plan congestion within the MCM.

Figure 3:
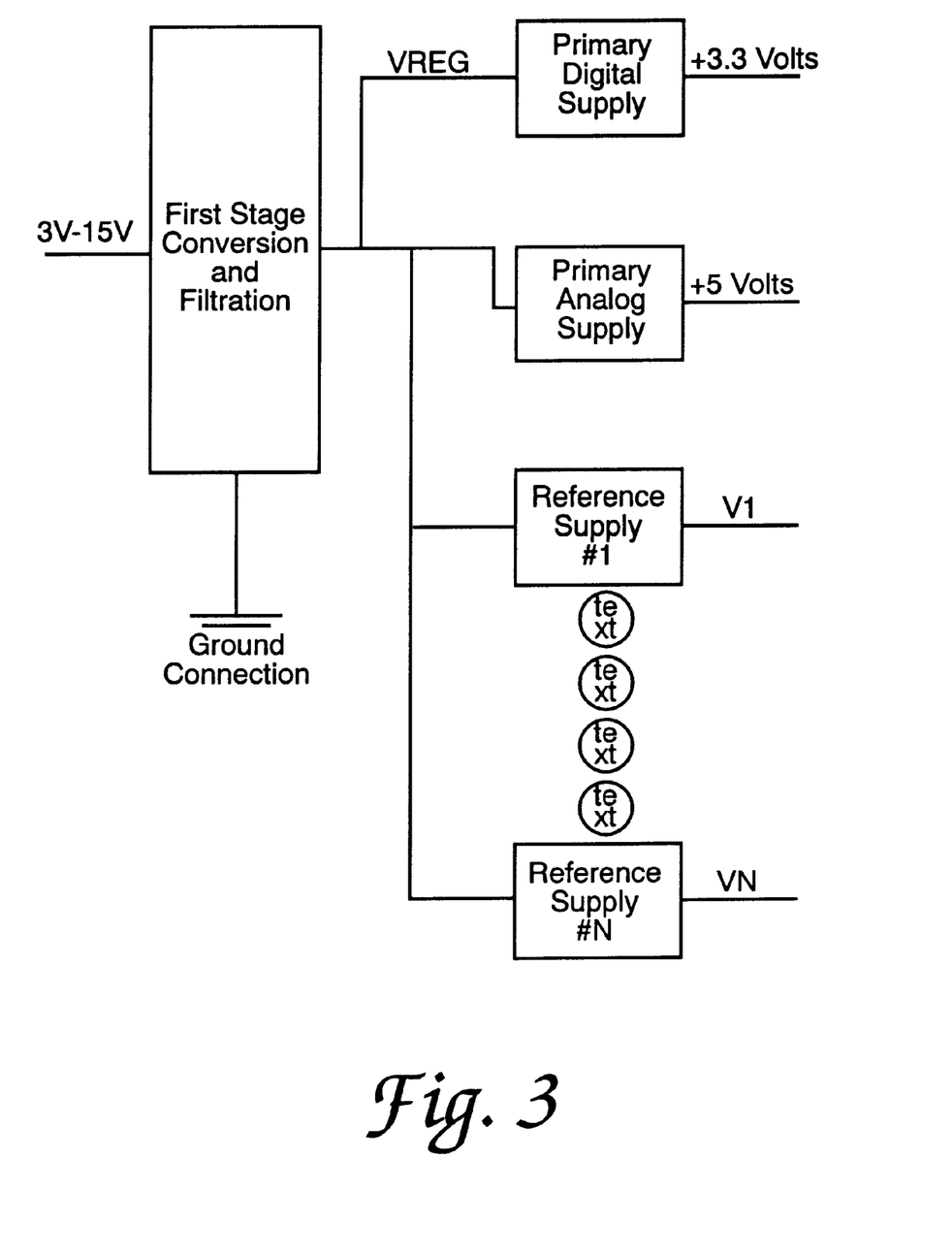
FIG. 3 is a top-level design of the embedded smart power convertor.
Figure 4:
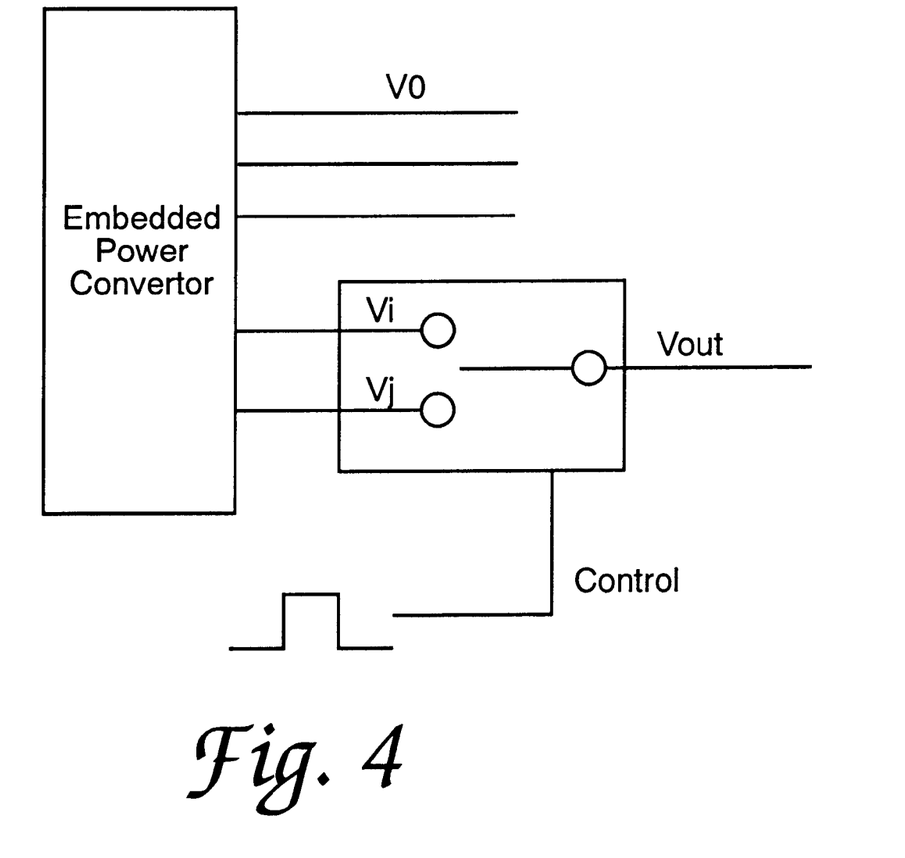
FIG. 4 shows an agile discrete I/O control concept.

The AIC can implement an internal embedded power convertor 10 that performs two key functions: generation of each operating and reference voltage needed within the AIC module and regulation and filtering of power supply irregularities over a very wide voltage range. FIG. 3 illustrates the top-level design of the embedded smart power convertor. The first stage power converts an unregulated supply voltage to a fixed, regulated voltage (VREG). A number of second stage convertors convert from the fixed VREG to several power voltages consumed internal to the AIC. These second stage voltages provide for the supply of internal digital power, internal analog power, and a series of reference voltages. These reference voltages make possible the stable interface of AIC to other systems even in the presence of power fluctuations, through agile approaches, such as shown in FIG. 4. Many topologies known in the art of power convertor design may be applied, whether switching based, linear based, or a combination of the two. Topologies for accommodating these wide ranges of variation may suffer from poor efficiency, but the overall lower power consumption of the AIC and known load characteristics, as enabled by the tightly-coupled design, compensates to some degree for the potentially inefficiencies of this scheme.

The internal embedded power conversion greatly extends AIC robustness, particularly when a number of adjustable internal voltage references are provided. When combined with agile analog, this capability allows the AIC to not only maintain its internally correct operating power supply under external variation, but this capability permits the AIC to maintain interface integrity. This concept is illustrated in FIG. 3, in which a discrete output is driven from two internally generated voltages selected by a control signal. Here, the switches could be transistor or MEMS-based.

Figure 5:
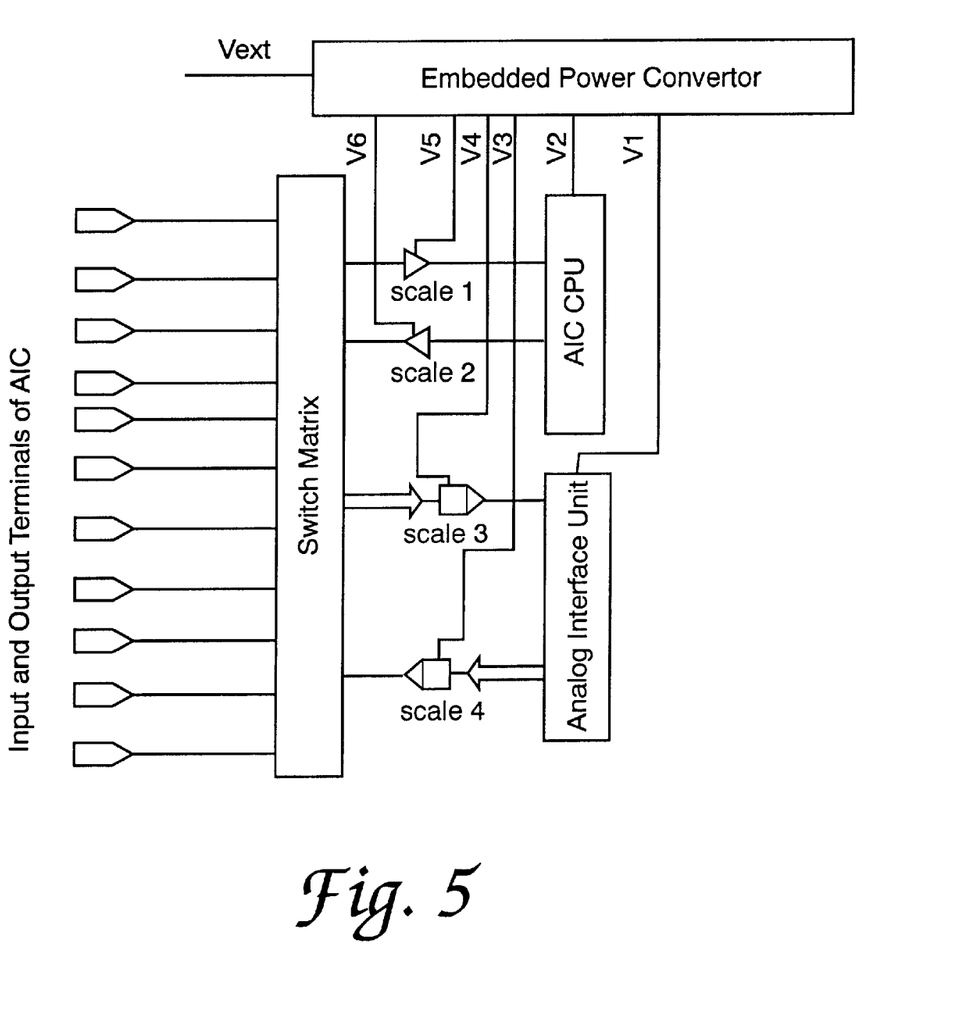
FIG. 5 illustrates the embedded power convertor concept.

FIG. 5 further illustrates the smart power concept. Vext is allowed to vary over a significant voltage range (e.g., 1.5V to 15V), yet V1–V6 are held constant. V1 is primary voltage to analog ASIC (or analog interface unit); V2 is primary voltage to AIC CPU. For purposes of power savings, V2 is as low in voltage as possible. V1 will be a higher voltage to provide for adequate signal headroom. Voltages V3–V6 are scaled to the interface as appropriate through scaling amplifiers scale 1–scale 4 such that I/O voltages are stable regardless of Vext fluctuations.

The AIC can re-route a subset of its external interconnections through the use of switch matrices 13 (see FIG. 1) built from micro-electromechanical systems (MEMS) technology. Such switches are superior to solid state switches for near-static reconfiguration of digital and analog signal lines due to lower series resistance, lower variability, ability to swing above and below rails without attenuation, lower noise, and non-volatility (when used with bi-stable MEMS switches). As such, the AIC is endowed with important capabilities, such as the re-location of I/O due to wiring errors or the need to fix the module within a system without necessarily pre-determining which pins are associated with which functions and the ability to create "chameleon" I/O, i.e., ability to make a single external pin manifest a great variety of different behaviors. This is especially attractive in the case where pin-limited AIC needs to be created and a greater number of digital and analog inputs are outputs. In these cases, the AIC can assign any of the available internal functions to any of a specific grouping of external pins. For applications where only analog inputs are needed, only those functions are provided to the external connections.

Figure 6:
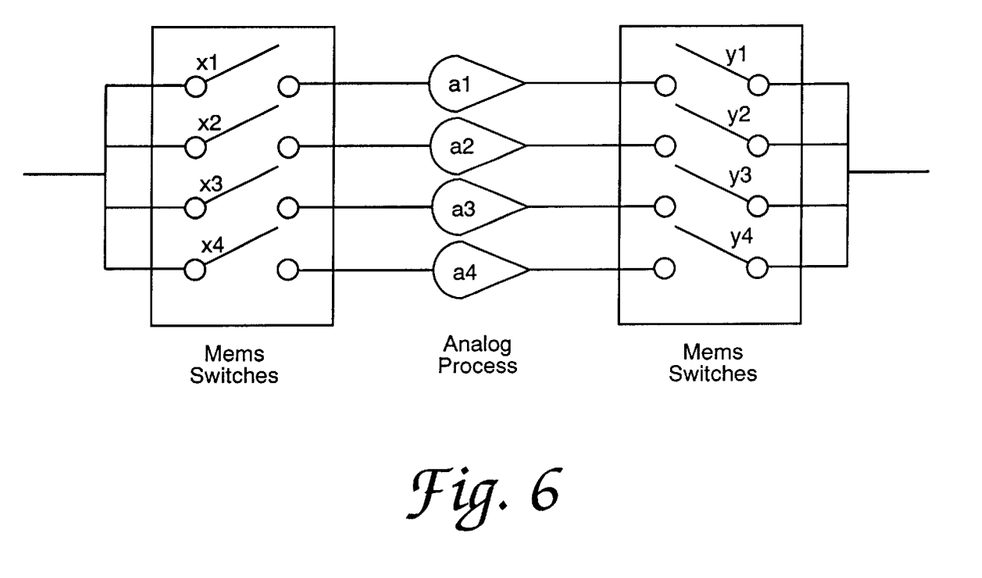
FIG. 6 is a simple implementation of bi-stable MEMS switches within the AIC.

One simple implementation of bi-stable MEMS switches within AIC is shown in FIG. 6. Here, a single monitored signal can be switched through switches X1–X4 to one or more analog channels (a1–a4). When the analog functions represented by a1–a4 are identical, then a form of functional redundancy is achieved, giving an increased fault tolerance to the signal monitoring function. When the analog functions a1–a4 differ, then different analog processing functions are selectively applied to the analog signal being monitored. The output of the analog channels are selected through switches y1–y4.

Figure 7:
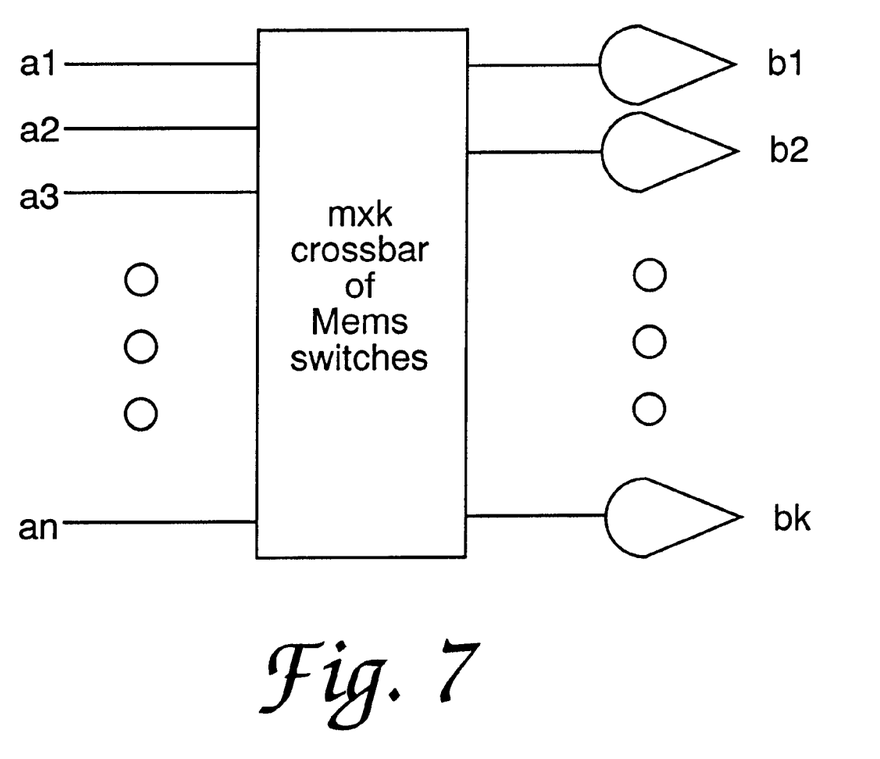
FIG. 7 shows a generalized form of the input section of the AIC.

A more generalized and flexible form of input section for the AIC is shown in FIG. 7. In this case, n signals are monitored and mapped to k analog process functions (with output b1 through bk) through a matrix of m x k MEMS switches. This arrangement allows considerable flexibility in re-routing signals around faulty process functions or applying multiple signals arbitrarily to different process functions.

Figure 8:
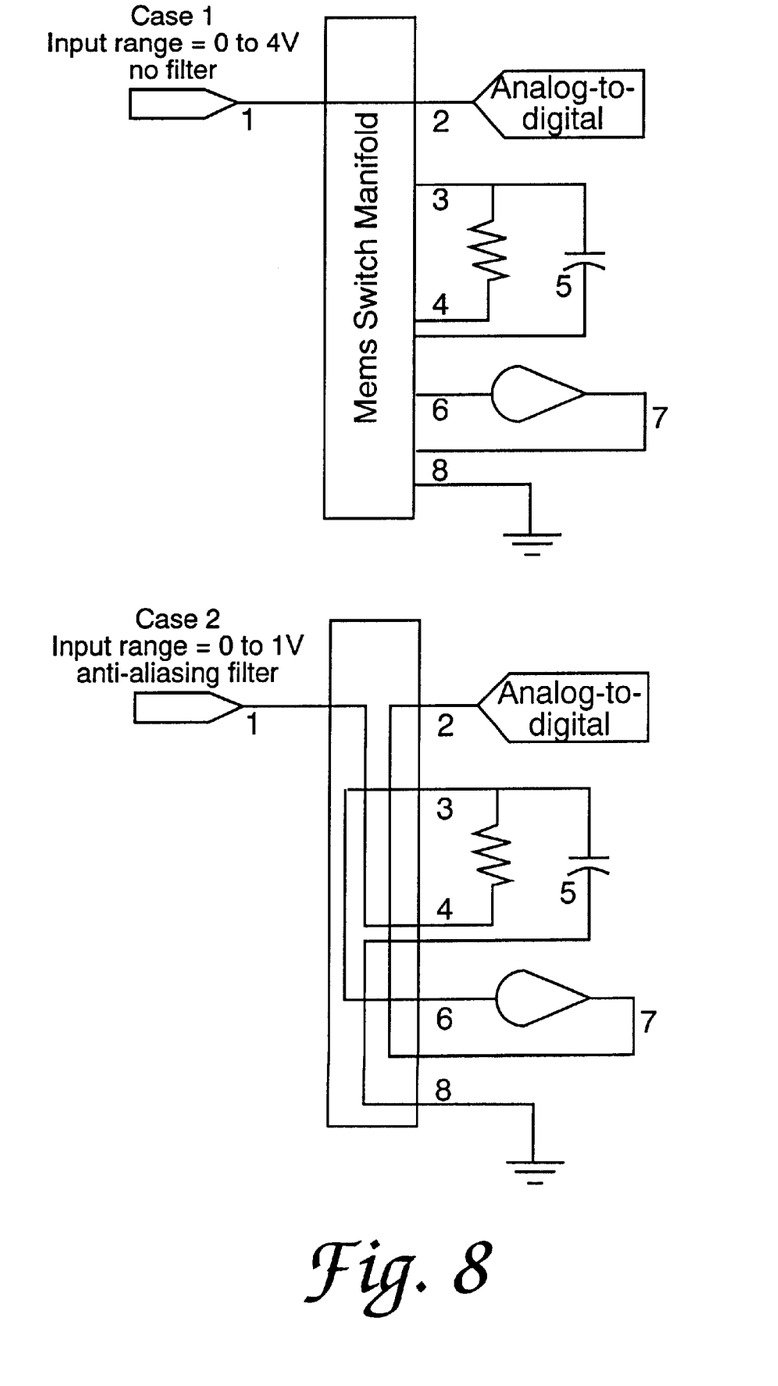
FIG. 8 is an example of the internal rewiring capability.

The ability to internally re-wire the AIC enables the AIC internal block diagram to be re-wired to a certain degree. A simple example implementation is shown in FIG. 8: These diagrams demonstrate the flexibility of internal re-wiring capability. In case 1, a sensor input is of a voltage range compatible with the analog-to-digital convertor in the analog interface unit. In this case, a single MEMS activates a path between internal terminals 1 and 2. In case 2, however, a gain and filtering operation is required on a weaker signal. In this case, MEMS switches connect paths 1 and 4, 2 and 7, 3 and 6, and 5 and 8, forming a front end gain and filter circuit. When a set of MEMS switches are available and connected within the AIC to various nodes, it is possible to rectify some types of circuit wiring errors by opening some connections and shorting others.

Figure 9:
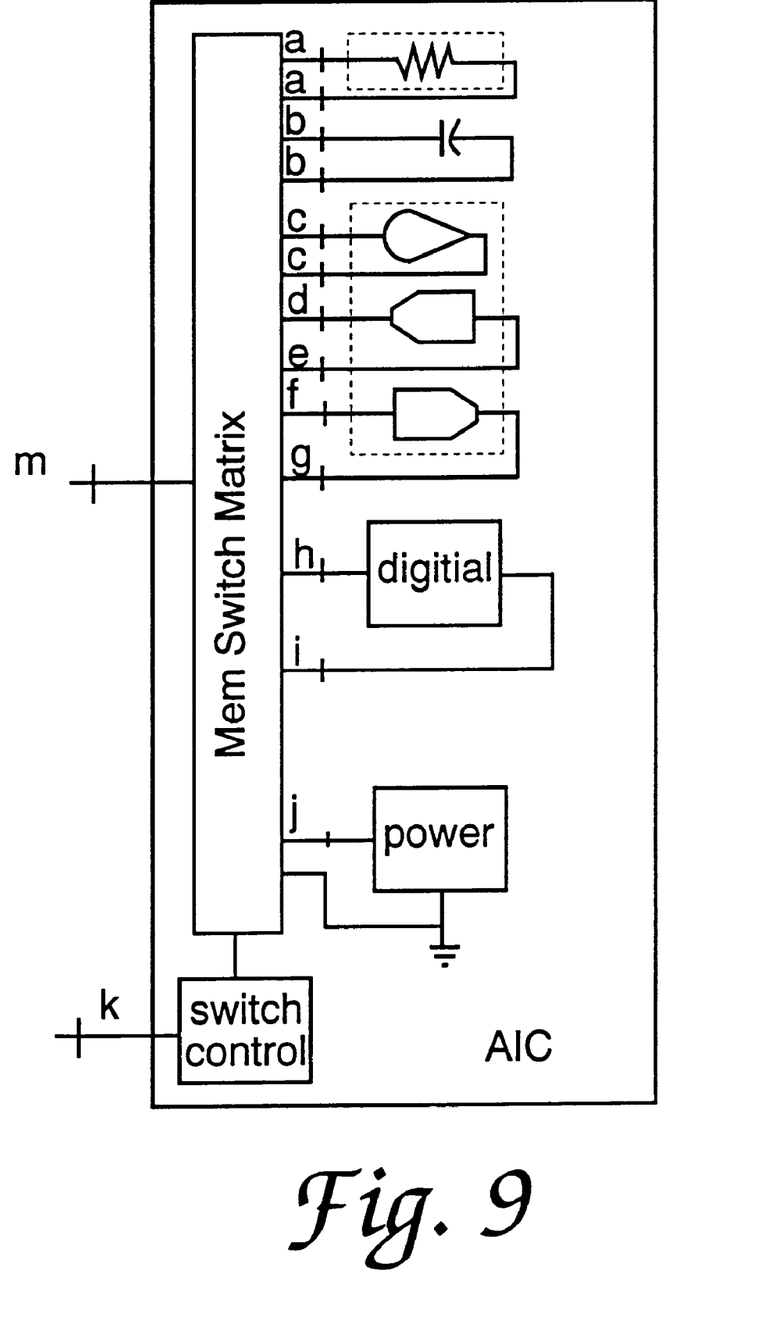
FIG. 9 is a general representation of a completely rewired AIC.

FIG. 9 illustrates a general extension of MEMS switching implemented within an AIC. Not only can the AIC restructure its internal and external interconnections, but it can interchange spare components kept in the module, but not normally used in a default ("factory set") condition. This implementation of AIC would contain m+k external input/output (I/O) terminals, but many more internal terminals, represented as: $2a+2b+2c+d+e+f+g+h+i+j+$terminals. The $2a$ terminals represent an abstraction of a resistor ASIC, the $2b$ terminals represent a collection of capacitors and other passive bilateral electrical components. The analog ASIC is abstracted by the internal block containing $2c+d+e$ terminals, where the $2c$ terminals represent a collection of analog function blocks; the d+e terminals represent multiplexed or non-multiplexed analog to digital convertors; and the f+g terminals represent digital to analog convertors. The digital block is abstracted to include the central processor, memories, and other internal AIC digital circuitry (except for the control block), with h+i terminals. The smart embedded power circuitry is abstracted by the j+l terminal block. For complete wireability between all circuit blocks a MEMS switch network of N terminals requires $(N^2-N)/2$ switches, where $N=2a+2b+2c+d+e+f+g+h+i+j+l+m$. As this could be an impracticably large number, it is necessary in most AIC implementations to choose subsets judiciously. Nevertheless, considerable flexibility in implementation is afforded.

In this manner, the AIC could carry a "toolkit" of internal building blocks (op amps, passive components, node monitoring functions, etc.) that are attached to the switching matrix for eventual connection as required in AIC applications. Such approaches allow more complex analog and digital functions to be assembled without the addition of external components.

By asserting a particular signal (PROG 14 in FIG. 1) the AIC will override its non-volatile storage program to receive a new one. The new program over-writes previous program information in the AIC, thereby reconfiguring the AIC within the system. The ability to preserve data or introduce self-modifying code is furthermore possible through implementing either a special op code instruction into the CPU instruction set or through a register transfer operation. The degree to which these techniques can be carried out are limited only by the fatigue mechanism associated with the non-volatile storage devices.

The AIC implements a bi-directional scheme for extending the operating voltage range of discrete drivers through a smart-signal concept. For outputs, one of two charge pumps are selected by the CMOS-level I/O in the CPU. These charge pumps are programmable in voltage and can be set to a large range of values. In this manner, a (0V, 3.3V) discrete can be transformed into a (−4V, +5V) signal, as an example. For inputs, the agile analog gain 9 and offset scheme can be employed. In this case, the gain and offset coefficients are selected and implemented by DACs such that the output voltages are converted to the (0V, $V_{dd}$) range (voltage ranges compatible with the normal AIC digital discretes).

The AIC design methodology involves tightly-coupled MCM design based on exploiting the shorter interconnections and higher intrinsic wiring and contact density of the MCM packaging medium. Examples of tightly-coupled MCM design include: reduction of output circuit drive for interior MCM nodes (to reduce capacitance and improve propagation delay); areal connections on integrated circuit die (particularly for patterned overlay MCM or flip-chip based interconnection schemes) to reduce die area and increase functionality; reliance on greatly expanded wiring density to access more integrated circuit interconnections than is practical outside the MCM substrate; mixture of integrated circuit and discrete devices in multiple processes optimized for yield and performance. Such design practices are exploited to give the AIC more capability in a smaller size, weight, and power profile than possible in printed wiring board and MCM-based designs of a similar nature that use more conventional integrated circuits and discrete components throughout the design.

A specific experimental implementation of the AIC is on JPL's Deep Space II (DS2) mission. Two aeroshells will piggyback on the Mars 98 mission scheduled to launch in January 1999. The aeroshells are designed to impact the Martian surface at a velocity of about 200 meters per second, releasing a miniature two-piece scientific probe that will punch into the soil to a depth of up to 2 meters. These probes will determine the presence of ice and make temperature, pressure, and sun detection measurements every hour over their expected 22-day operating lifetime. The data will be temporarily stored on the probes' microcontrollers and relayed back to earth via the Mars Global Surveyor spacecraft.

Figure 10:
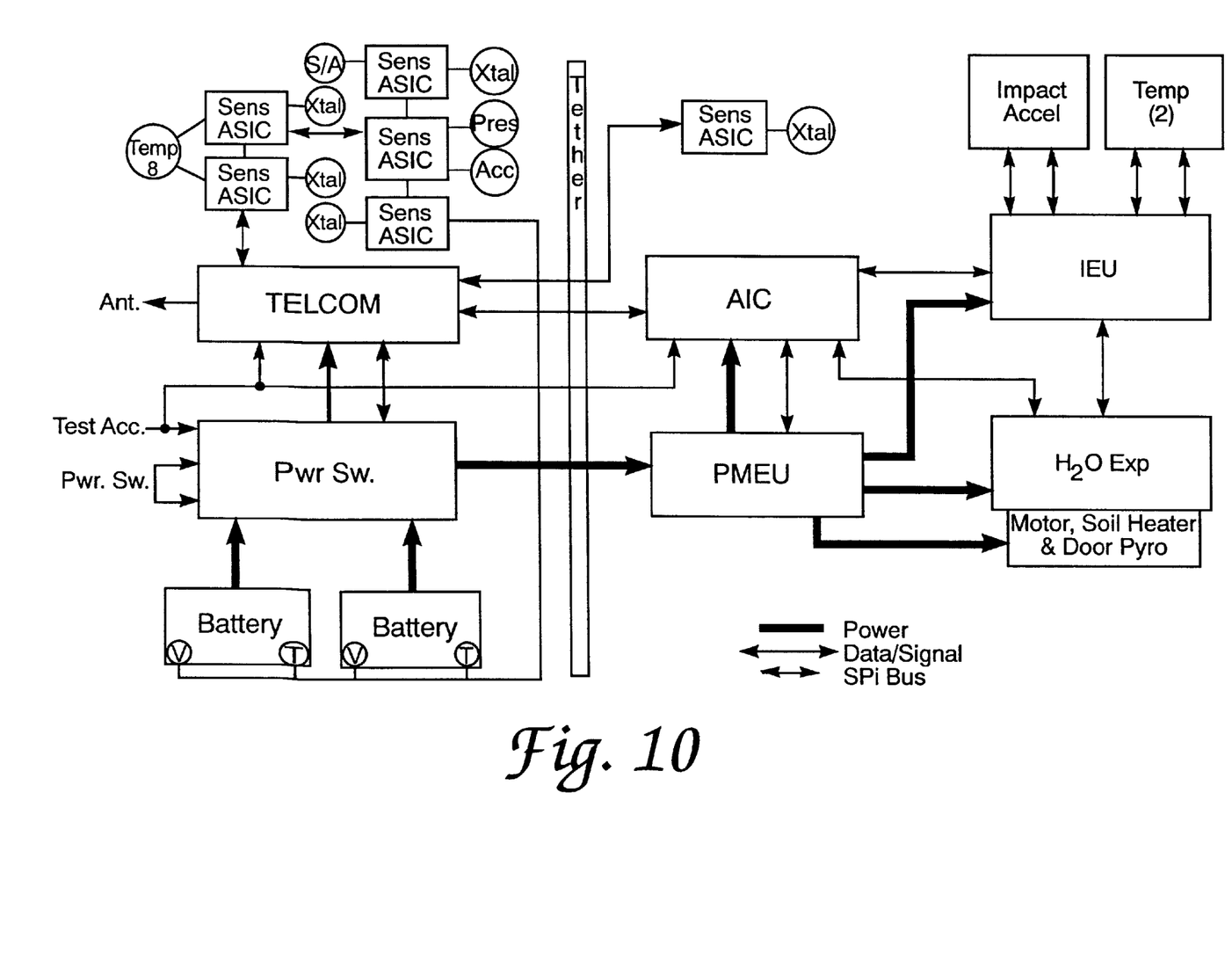
FIG. 10 shows where the AIC fits into the Deep Space II (DS2) electronics block diagram.
Figure 11:
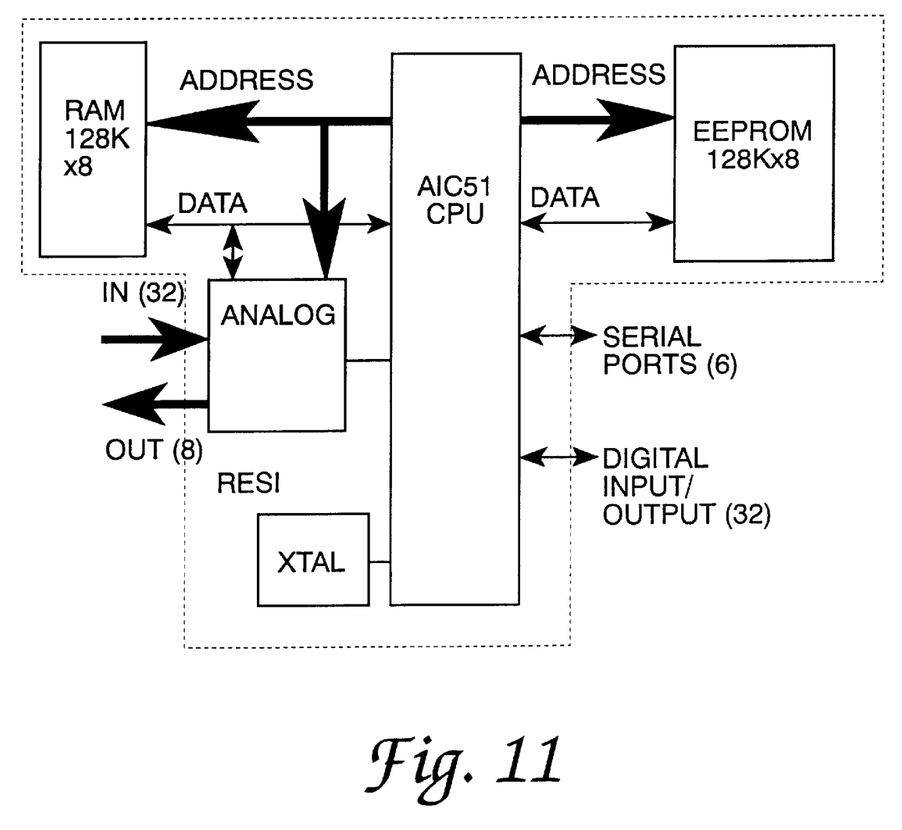
FIG. 11 is a general description of the AIC design as implemented on Deep Space II.
Figure 12:
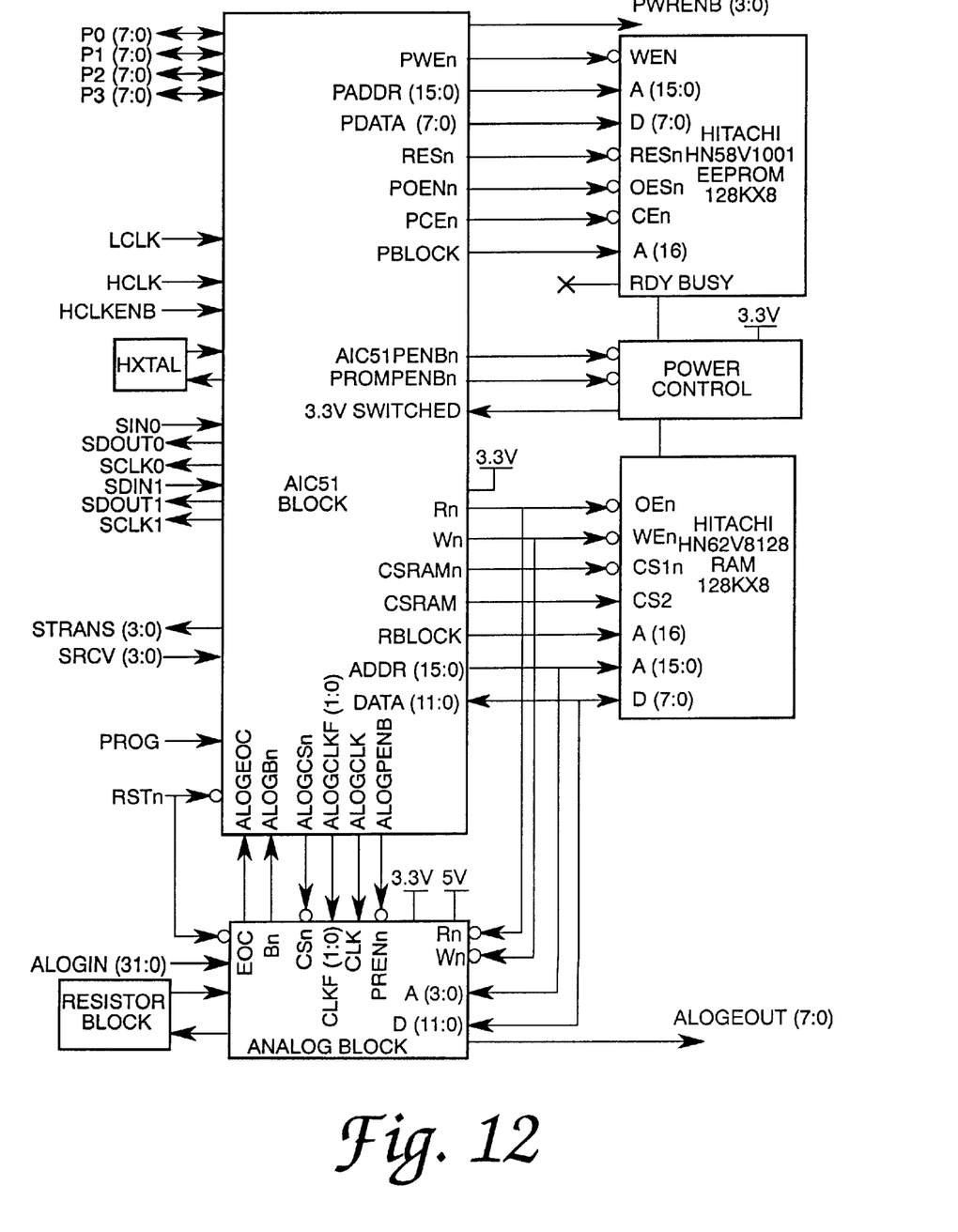
FIG. 12 is a detailed block diagram of AIC/DS2.
Figure 13:
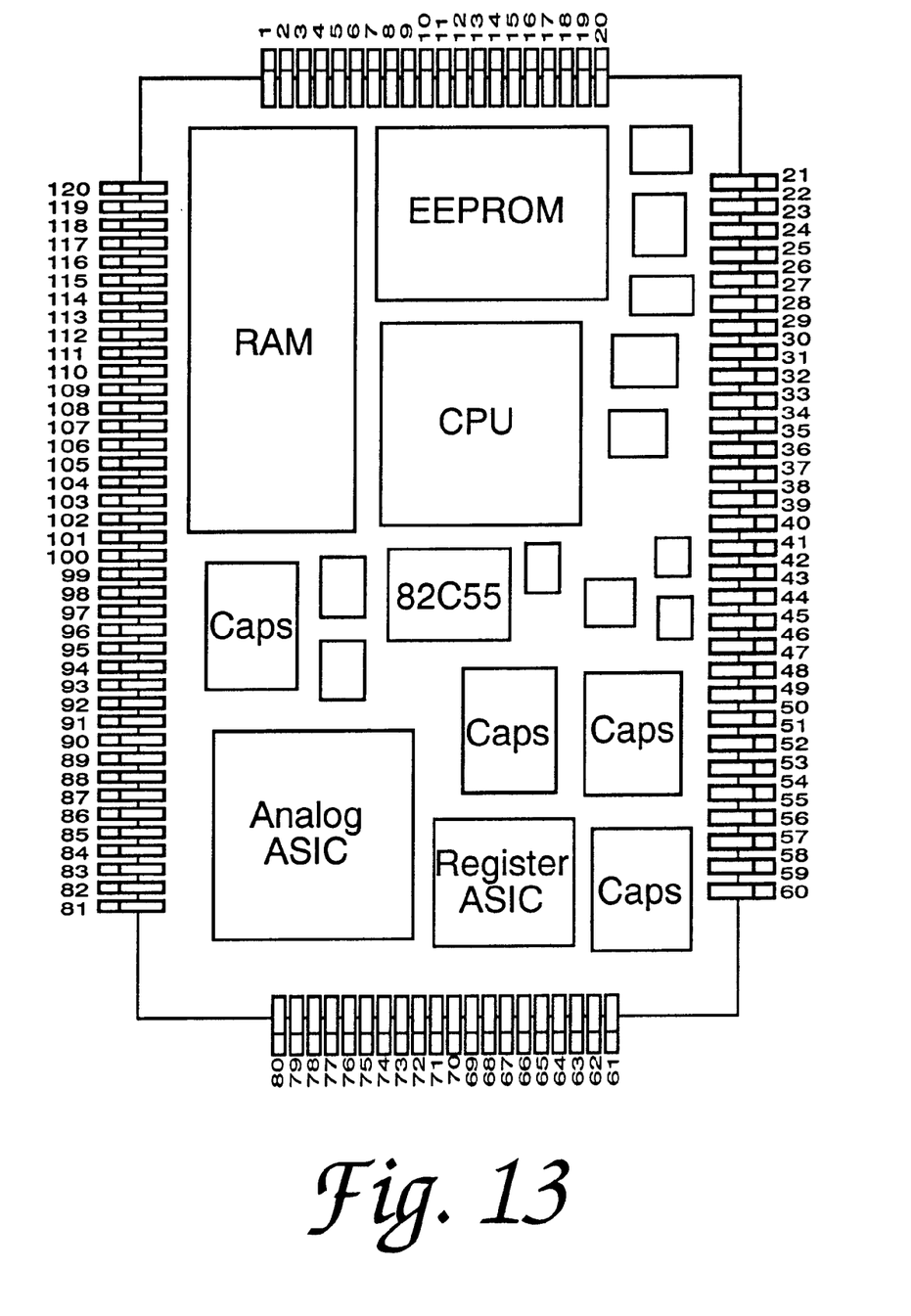
FIG. 13 shows the AIC package outline for DS2

The microcontrollers on DS2 will be AIC's capable of operating in temperatures of 0 to 120° C. and able to withstand the shock of 30,000 G's at impact. The DS2 electronics block diagram is shown in FIG. 10 indicating the location of the AIC unit. A general description of the DS2 AIC is shown in FIG. 11. A detailed block diagram is shown in FIG. 12 and a package outline in FIG. 13.

The matter set forth in the foregoing description and accompanying drawings is offered by way of illustration only and not as a limitation. Other variations to the current design include a surface-mounted program/prototype area for MEMS-based or other sensors and components, including an AIC "personality" module plug-in socket, for extending AIC functionality without altering the AIC's floor plan size (similar to a co-processor socket). A RAM-based field programmable gate array(s) interfaced internally within the AIC and configured automatically through a downloading mechanism involving AIC's internal CPU and access of the non-volatile memory might also be included. For a system application involving a distribution of AICs, radio-frequency power and radio-frequency communications between peer AIC's can be envisioned. Fire-and-forget sequence generators (programmable waveform generators) with synchronous/asynchronous clock operation are also possible extensions to the presently conceived design.

Numerous applications for AICs come to mind where modest amounts of processing are required in dimensionally constrained and/or remote locations. Such applications include motor controllers, cryocooler refrigerator controllers, distributed health and status monitoring systems, configuration management processors, safety interlock protocol management, security systems, miniature weapons computers, space probe central control processor, beacon processor, and jet engine control. AICs could also be used on the manufacturing floor for smart, discontinuous low-level sensing, test equipment probes, embedded credit card processors, wearable computers, or remote data logging.

What is claimed is:

1. a stand-alone multi-chip module (MCM) instrument controller having each of its components tightly-coupled within the MCM, the instrument controller comprising:

a. a low-power central processing unit (CPU);
 b. a large non-volatile memory storage system for program and data storage;
 c. a large volatile memory storage system with storage components comparable to or larger than the address space that the CPU operates upon;
 d. at least two internal oscillators for high-frequency and for low frequency operation;
 e. an analog ASIC means for improved isolation and optimization of analog functions;
 f. a plurality of analog input means through a digitizer (analog-to-digital convertor) with resolution of greater than 9 bits;
 g. a plurality of simple serial port interfaces;
 h. a plurality of discrete input/output bi-directional signal I/O lines having set-able pull-up or pull-down characteristics;
 i. a plurality of analog outputs each controlled by an independent digital-to-analog convertor;
 j. a plurality of agile analog signal paths whereby a global gain, offset, and filtration (e.g., anti-aliasing) on all input channels can be implemented as well as channel specific values for gain, offset, impedance, and filtration;
 k. a resistor ASIC or discrete passives embedded within the substrate or interconnection manifold to support said analog ASIC;
 l. an internal embedded power convertor means capable of generating each operating and reference voltage needed within the instrument controller and of regulating and filtering power supply irregularities over a wide voltage range;
 m. a signal distribution manifold comprised of a plurality of switch matrices of micro-electromechanical systems whereby a subset of the instrument controller's external interconnections can be re-routed;
 n. a signal path to override said non-volatile storage system, whereby the instrument controller can be reconfigured within; and
 o. a smart signal adaptation means whereby the operating range for discrete drivers is extended and internal and external signal and power path routing can be effected under control of the AIC's processor.

* * * * *